(12) United States Patent
Astarabadi

(10) Patent No.: US 6,408,280 B1
(45) Date of Patent: Jun. 18, 2002

(54) DATA DRIVEN CONSTRAINTS ENGINE

(75) Inventor: Shaun Astarabadi, Laguna Niguel, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 0 days.

(21) Appl. No.: 09/358,866

(22) Filed: Jul. 22, 1999

(51) Int. Cl.[7] .............................................. G06F 17/60
(52) U.S. Cl. ...................................................... 705/26
(58) Field of Search ........................ 713/1; 705/1, 26; 707/1, 100, 104, 500

(56) References Cited

U.S. PATENT DOCUMENTS

| | | |
|---|---|---|
| 4,947,320 A | 8/1990 | Crus et al. |
| 5,220,662 A * | 6/1993 | Lipton ........................ 714/39 |
| 5,408,657 A | 4/1995 | Bigelow et al. |
| 5,446,652 A | 8/1995 | Peterson et al. |
| 5,513,350 A | 4/1996 | Griffin et al. |
| 5,740,441 A | 4/1998 | Yellin et al. |
| 5,799,295 A | 8/1998 | Nagai |
| 5,899,990 A | 5/1999 | Maritzen et al. |
| 6,345,266 B1 * | 2/2002 | Ganguly ........................ 707/1 |

* cited by examiner

Primary Examiner—Thomas M. Heckler
(74) Attorney, Agent, or Firm—Pillsbury Winthrop LLP

(57) ABSTRACT

Described are a system and method for automatically evaluating system constraints which are represented by strings of symbols. A string of symbols each of the constraints as a function of certain system variables. Each symbol represents either an operator for providing a Boolean result, an operand or a command. Each symbol in the string is serially processed one symbol at a time. If the symbol is representative of an operand, the symbol is pushed onto a stack maintained in a computer readable memory. If the symbol is representative of an operator, the operator is executed to provide a Boolean result based upon one or more operands retrieved from the top of the stack and the Boolean result is pushed onto the stack. If the symbol is representative of a command, the command is conditionally executed based upon a Boolean result retrieved from the top of the stack.

24 Claims, 3 Drawing Sheets

DATA DRIVEN CONSTRAINTS ENGINE

BACKGROUND

1. Field of the Invention

Embodiments described herein relate to the automated evaluation of system constraints. In particular, certain embodiments relate to a computer based implementation of a method for evaluating constraints.

2. Related Art

Computerized systems for evaluating system constraints may be applied to solve several problems. Such systems may be applied as part of a diagnostic procedure or as a product design tool in which a product or system design is optimized subject to certain design constraints. These design constraints are typically modeled as a set of rules which are represented in computer readable code. In one example, a typical on-line built to order system allows customers to select options for a custom built product. Such a built to order system may limit certain design features according to constraint rules. These design constraints limit the selection of options for a built to order product.

FIG. 1 illustrates a typical Worldwide Web page enabling customers to select a custom desktop computer configuration from a manufacturer. Several pull down menus enable the selection of, among other things, a processor, memory, hard disk drive or a CD-ROM drive. While each of the pull down menus may provide a customer with several options for each component, the custom product may not be able to accommodate all possible combinations of selections. For example, an operating system such as Windows NT 4.0 requires at least 32 megabytes of RAM on the host machine. Therefore, a selection of memory with less than 32 megabytes of RAM may be incompatible with a previous selection of Windows NT 4.0 as the host operating system. Also, the customer may select a DVD player as the CD-ROM device. However, a software driver for the DVD player is not available on the Windows NT 4.0 operating system. Such selections, therefore, typically cause the Worldwide Web page to provide the customer with a message or warning that the selections provided are not compatible.

To model the constraints limiting the possible combinations of selections, the Worldwide Web page typically apply a set of rules defining the constraints. These processes may then evaluate customer selections and display messages or take other appropriate action based upon the selections. The rules defining the system constraints are typically implemented in computer code which comprises several "if then" instructions for operating on data representative of the customer selections. Such an implementation of the constraint rules structure is cumbersome and difficult to modify.

SUMMARY

An object of an embodiment of the present invention is to provide an automated method for evaluating the application of constraints to a system.

It is another object of an embodiment of the present invention is to provide an implementation of an automated system constraint model which permits a simplified modification of constraint rules.

It is yet another object of an embodiment of the present invention to provide an automated built to order system which is readily modified for changes in product design constraints.

Briefly, an embodiment of the present invention is directed to a system and method for automatically responding to a violation of a constraint in a system defining one or more constraints. A string of symbols preferably represents each of the constraints. Each symbol represents either an operator for providing a Boolean result, an operand or a command. Each symbol in the string is serially processed one symbol at a time. If the symbol is representative of an operand, the symbol is pushed onto a stack maintained in a computer readable memory. If the symbol is representative of an operator, the operator is executed to provide a Boolean result based upon one or more operands retrieved from the top of the stack and the Boolean result is pushed onto the stack. If the symbol is representative of a command, the command is conditionally executed based upon a Boolean result retrieved from the top of the stack.

By modeling each constraint as a string of symbols, the logic for processing evaluating the constraints may be fixed for evaluating all constraints. Changes in the constraints model to reflect changes in system constraints may be effected by including modifying the symbol strings, adding new symbol strings or deleting symbol strings. This avoids the cumbersome logic for modeling constraints which is difficult to modify and maintain in a system model where system constraints change.

DETAILED DESCRIPTION

Embodiments of the present invention are directed to an apparatus and method of evaluating constraints of a system. Each constraint is expressed as a string of symbols. A processor evaluates the system subject to the constraints by processing each of the strings one symbol at a time using a set logic structure. The constraints are preferably evaluated when there is a change in variables defining the system. Modeling the system constraints as individual strings of symbols enables a simple modification of the system constraints model which does not require complicated modifications to existing computer software code.

Figure 1:
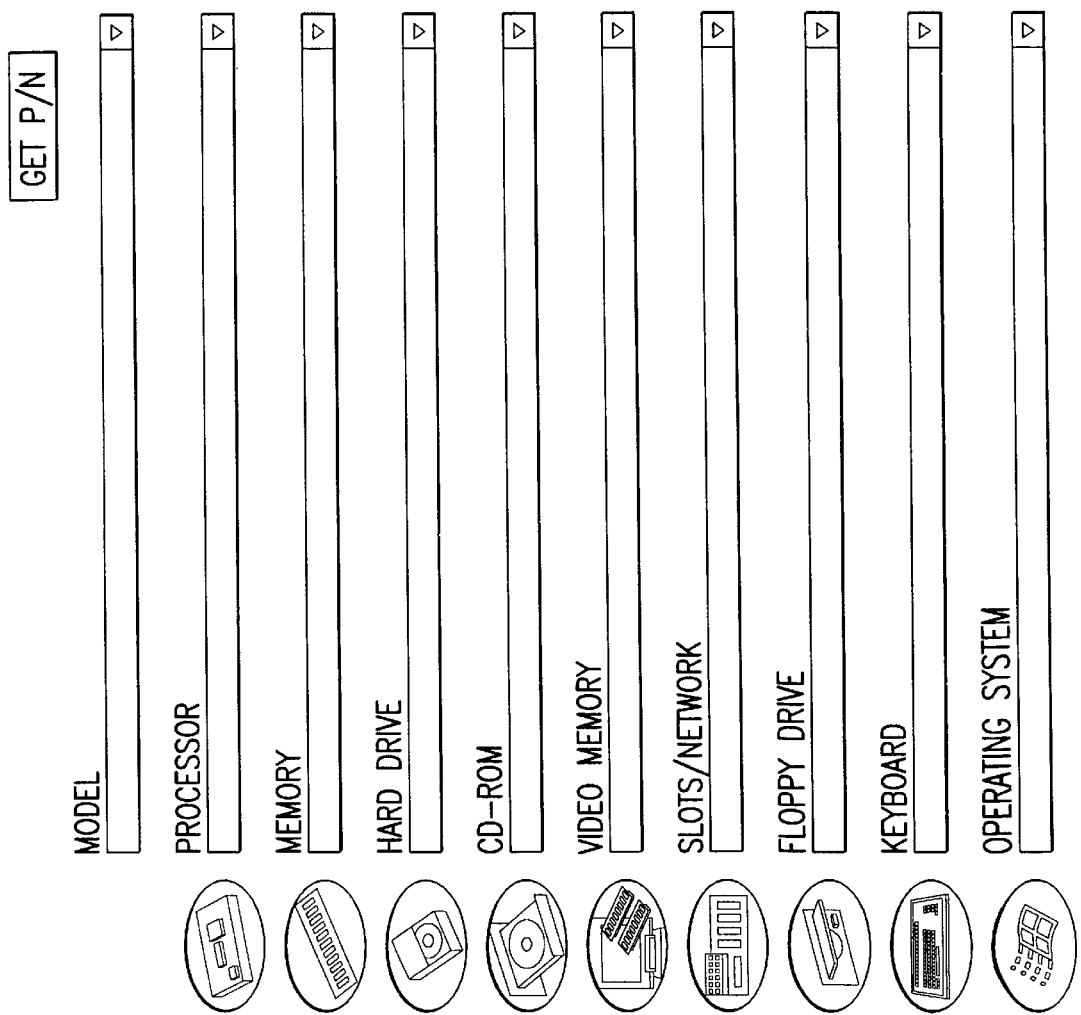
FIG. 1 illustrates a graphical user interface for receiving customer inputs in a built to order system.
Figure 2:
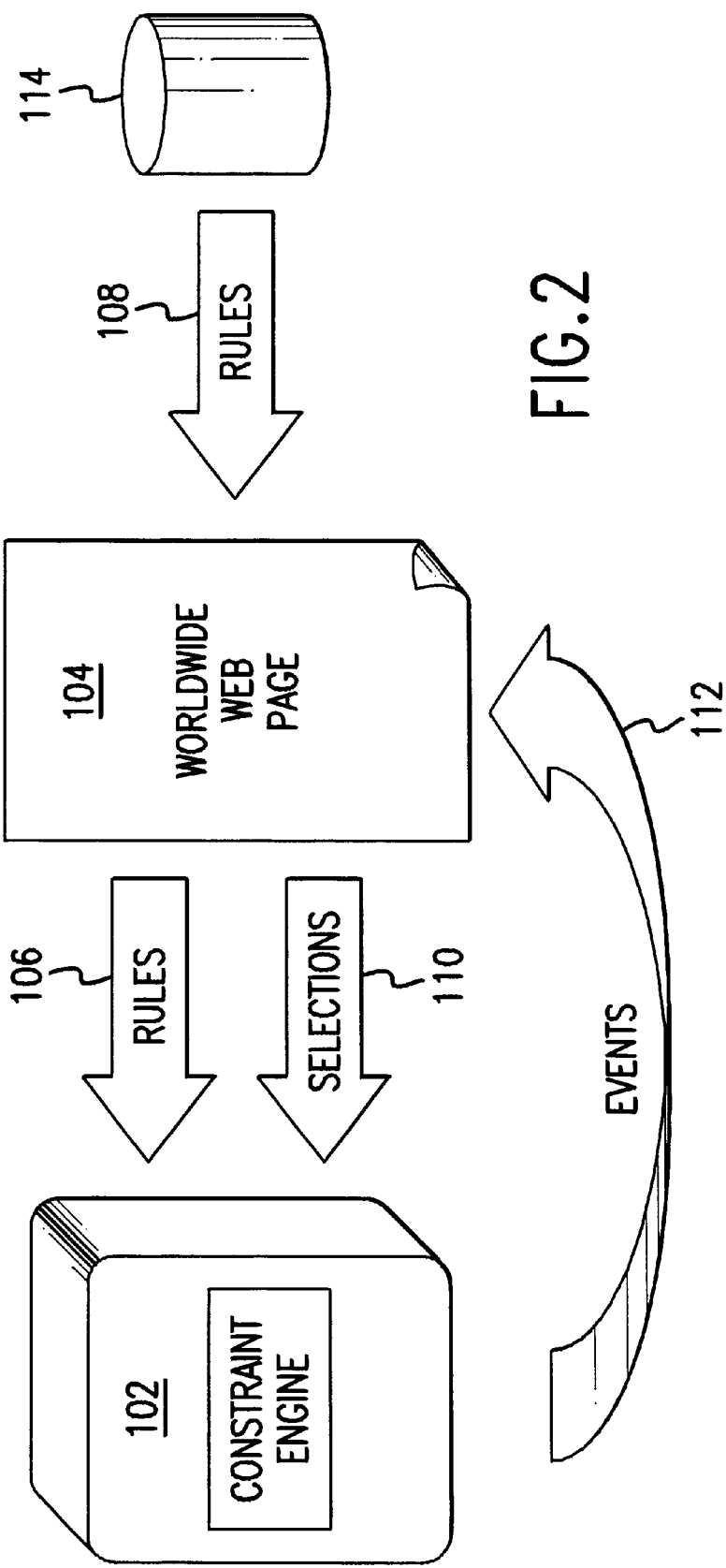
FIG. 2 illustrates a functional architecture of an embodiment of a system for evaluating system constraints in an on-line built to order system.

FIG. 2 illustrates a system diagram of an on-line system for selling custom configured products such as personal computer systems as illustrated above with reference to FIG. 1. In FIG. 2, the rules which determine the constraints in a configuration are executed in a constraint engine 102. The constraint engine 102 preferably implements the constraint logic using instructions specified in a reverse Polish notation ("RPN"). Each constraint is implemented as a set of symbols in a string where the symbols may include a logical operator, an operand, or a command. The operators provide a Boolean result based upon a single operand or two operands.

In an application of the constraint engine 102 to the custom configuration system as shown in FIG. 1, upon each selection of an item by the user, the constraint engine 102 preferably reevaluates the selections and initiates appropriate action. The constraint engine 102 is executed upon each selection that the user makes at any of the pull down menus. Therefore, in response to any selection in the process of defining the configuration, the constraint engine 102 may initiate a response to a violation of a constraint such as, for example, a display of a message alerting a user of a violation of a constraint.

In the preferred embodiment of the present invention, a web server (not shown) transmits data to a web browser executing on a client workstation (not shown) to facilitate communication between the client workstation and the web server. The client workstation preferably includes a processor, memory and display for supporting an Internet browser such as a Netscape 3.0 browser and above or Microsoft Internet Explorer 3.0 and above. The client workstation also preferably includes hardware such as a telephone modem or broadband cable modem for facilitating communication with the web server through the Internet.

When the browser at the client workstation accesses a Worldwide Web page 104, the web server initializes the Worldwide Web page 104 at the client workstation browser in a manner known to those of ordinary skill in the art. As part of this initialization, the web server also preferably initializes instructions for the constraint engine 102 which is executable under the control of the Worldwide Web page 104, and rules 108 which are representative of system constraints. These rules 108 are preferably retrieved from a database 114 maintained at the web server. The Worldwide Web page 104 may then format the aforementioned strings of symbols based upon the rules 108.

The Worldwide Web page 104 preferably includes several HTML instructions which provides a visual display acting as part of a graphical user interface (GUI) at the client workstation. In an embodiment directed to an on-line built to order system, such a display may be similar to that illustrated in FIG. 1. The Worldwide Web page 104 also preferably includes one or more script instructions which enables communication between the constraint engine 102 and either the web server or the customer at the client workstation. The script instructions may be implemented as instructions from JavaScript or Visual Basic Script. The constraint engine 102 is preferably implemented as a Java Applet. Script instructions in the Worldwide Web page 104 preferably initiate the execution of the constraint engine 102 upon detection of certain events such as a selection by the customer at the Worldwide Web page 104 or changes in the rules 108 transmitted by a web server to the client workstation.

As shown in FIG. 2, events 112 are detected at the Worldwide Web page 104 which may initiate the execution of the constraint engine 102. Such events may include, for example, a customer selection at a GUI such as that illustrated with reference to FIG. 1. Upon detecting such an event, the Worldwide Web page 104 initiates execution of the constraint engine 102 based upon selection data 110 (received from customer selection) and rules 106 (received from the web server database 114). The constraint engine 102 then detects violations of a constraint represented in rules 106 from selection data 110. Alternatively, the Worldwide Web page 104 initiates execution of the constraints engine 102 upon detection of changes in the rules 108 transmitted by the web server. In yet another alternative embodiment, the Worldwide Web page 104 may initiate the execution of the constraints engine 102 upon detection of either changes in the rules 108 or customer selections.

Table 2 summarizes some of the operators which may be symbols in a string of symbols modeling a system constraint according to an embodiment. Some of these operators require a single operand while others require two operands. Each of these operators provides a Boolean result.

TABLE 1

| Operator | Description |
| --- | --- |
| ! | Logical NOT. |
| & | Logical AND comparison. |
| \| | Logical OR comparison. |
| > | GREATER THAN numeric comparison evaluation. |
| < | LESS THAN numeric comparison evaluation. |
| = | Equality numeric comparison evaluation. |

Table 2 below illustrates some of the operands which may be symbols in a string of symbols modeling a constraint in an embodiment directed to a built to order system for a desktop computer system. The operands listed in Table 2 are preferably variables representative of values stored in a memory such as a memory at the client workstation. The Worldwide Web page 104 preferably determines and maintains these variables in response to customer selections at the GUI of the workstation. Operands in the constraint strings may also include fixed numerical values.

TABLE 2

| Operand | Type | Description |
| --- | --- | --- |
| MEM | Integer | Size of memory either selected by customer or selected by default |
| DVD | Boolean | Selection of DVD drive as the CD-ROM drive |
| OS_NT4 | Boolean | Selection of Windows NT 4.0 ™ as the operating system |
| OS_W98 | Boolean | Selection of Windows 98 ™ as the operating system |
| Misc_ZIP | Boolean | Selection of Zip ™ drive |
| NIC | Boolean | Selection of network interface card |
| PCMCIA_NONE | Boolean | No PCMCIA card selected |

In addition to operators and operands, the symbols in a string of symbols representing may also represent executable commands. A first type of command is an "event handle" which is preferably executed when a system constraint is violated. In an embodiment, an event handle is identified by the character "@" followed by characters identifying a specific event. In processing an event handle, the constraint engine 102 passes the event handle to an "Event_Handler" process at the Worldwide Web page 104 and the Worldwide Web page 104 initiates appropriate action such as the display of a message to the customer indicating that a particular selection violates a constraint. Each event handle may be implemented as a software exception and the Event_Handler may be implemented as a corresponding exception handler using techniques known to those of ordinary skill in the art of Java software programming.

A second type of command is an indication of a beginning of a new string of symbols representing a constraint. In the presently illustrated embodiment, such a symbol is the character "$" followed by characters identifying the constraint which is represented in the following string of symbols. In an embodiment in which the constraint engine 102 is implemented in Java instructions, the characters following the character "$" are preferably displayed in a Java console for debugging purposes. Additionally, the constraint engine 102 preferably clears a state machine stack (discussed below) when processing such an indication of a subsequent string of symbols representing a constraint.

Table 3 below illustrates an example of three constraints expressed in three corresponding strings of symbols. Constraint 1 relates to the 32-megabyte memory requirements for a Windows NT 4.0 operating system. Constraint 2 relates to a constraint that a Windows NT 4.0 operating system does not include a driver for a selected DVD player. Constraint 3 relates to a constraint that central bus of the computer system provides a limited number of hardware interrupts for supporting peripheral devices.

TABLE 3

| Constraint Number | String of Symbols |
|---|---|
| 1 | $ NT4 Requires 32 MB RAM or more. |
| | MEM |
| | 32 |
| | < |
| | OS_NT4 |
| | & |
| | @ MESSAGE NT4 requires 32-MB minimum. |
| 2 | $ No DVD driver is available for NT4 |
| | DVD |
| | OS_NT4 |
| | & |
| | @ WARNING Check Web site for driver availability. |
| 3 | $ Interrupt limitation problems |
| | DVD |
| | NIC |
| | & |
| | Misc_ZIP |
| | PCMCIA_NONE |
| | ! |
| | | |
| | & |
| | @ ERROR Illegal choice, network choice is changed. |
| | @ SELECT NIC_CATEGORY, NIC_NONE |

While processing each of these strings of symbols, the constraint engine 102 preferably maintains a "stack" for detecting when constraints are violated. A "stack" is a data structure known to those of ordinary skill in the art of computer programming where data items are retrieved in the reverse order in which they are stored ("last in first out"). For example, with constraint 1, the constraint engine 102 "pushes" the first symbol in the string onto the stack. Here, the symbol is "MEM" which represents the size of a selected or default memory. The constraint engine 102 retrieves data by the symbol MEM and pushes this data onto the stack. The constraint engine 102 processes the second symbol, the integer "32," by pushing this integer onto the stack. The constraint engine 102 then processes the third symbol in constraint 1 which is an operator "<". Determining that the third instruction is an operator, the constraint engine 102 applies the operator to entries on the stack. Here, the operator requires two operands to provide a Boolean output. The operator evaluates whether the selected or default memory MEM is less than 32 megabytes. The result of the operation, being either true or false, is then pushed onto the stack.

The next symbol is "OS_NT4" which is a Boolean operand indicating whether the Windows NT 4.0 operating system is selected. Since this symbol is an operand, the constraint engine 102 retrieves and pushes the data represented by this operand onto the stack. Next symbol "&" is a logical "and" operation requiring two Boolean operands. Upon interpreting this symbol, the constraint engine 102 "pops" two values from the top of the stack (i.e., the Boolean output of the operator "<" and the Boolean value "OS_NT4"), executes the "&" operation by performing a logical "and" comparison of the popped values and pushes the Boolean result onto the stack.

The next symbol is a command which includes the symbol "@" followed by a message "NT4 requires 32 MB minimum." Upon receipt of this command instruction, the constraint engine 102 passes this event handle to the Worldwide Web page 104 if the top of the stack is a "true" Boolean value.

After processing a string of symbols in constraint 1, the constraint engine 102 commences processing the string of symbols of constraint 2 beginning with the symbol "$ No DVD driver is available for NT4." The constraint engine 102 clears the stack, retrieves the Boolean information represented by the operand "DVD" and pushes it onto the stack. The constraints engine 102 recognizes that the next symbol "OS_NT4" is an operand, retrieves the Boolean data represented by this operand and pushes this retrieval data onto the stack. Recognizing that the next symbol in the string is a "&", the constraints engine 102 pops the top two values pushed onto the stack (i.e., the data represented by the operands DVD and OS_NT4) and performs a logical "and" comparison of these values. The result of this comparison is true if a DVD drive is selected as a CD-ROM in combination with a Windows NT 4.0 operating system. The constraints engine 102 pushes the Boolean result of this comparison onto the stack. The next symbol is "@" followed by the words "WARNING Check Website for driver availability" to indicate that a DVD play was selected without an operating system containing a driver for the DVD player. The constraints engine 102 then preferably provides an appropriate event handle to the Event Handler at the Worldwide Web page 104 if the Boolean value on the top of the stack is true.

After processing a string of symbols in constraint 2, the constraint engine 102 commences processing the string of symbols of constraint 3 beginning with the symbol "$ Interrupt limitation problems." This constraint determines whether sufficient hardware interrupts are available to support all of the selected peripheral devices for the custom built computer system. Following clearing the stack, the constraint engine 102 pushes the Boolean information represented by the operands "DVD" and "NIC" onto the stack. In processing the next symbol, "&," the constraint engine 102 pops the top two stack items (i.e., the information represented by DVD and NIC), makes a logical "and" comparison of these two values and pushes the Boolean result of this comparison onto the stack.

The constraint engine 102 then pushes the information represented by the operands "Misc_ZIP" and "PCMCIA_NONE" onto the stack. In processing the next symbol "!," the constraints engine 102 pops the top two stack items (i.e., the information represented by Misc_ZIP and PCMCIA_NONE), makes a logical "or" comparison of these two values and pushes the Boolean result of this comparison onto the stack. In processing the next symbol "|," the constraint engine 102 pops the top stack item (i.e., the Boolean result of the logical "or" comparison), inverts this item to perform a logical "not" operation and pushes the result onto the stack. In processing the subsequent "&" symbol, the constraints engine 102 pops the top two stack items (i.e., the Boolean results of the first logical "and" comparison and the logical "not" operation), makes a logical "and" comparison of these two values and pushes the result of this comparison onto the stack. If this result is true, the constraint engine 102 passes the event handles associated with the symbols "@ERROR Illegal choice, network choice is changed" and "@SELECT NIC_CATEGORY, NIC_NONE" to the event handler of the Worldwide Web page 104.

The commands in the above-described embodiments are directed to transmitting a messages indicating a violation of constraint. However, it is understood that such commands may take other forms. For example, a string of symbols may be directed to modeling a condition which affects the availability of subsequent selections. Referring to the build-to-order GUI shown in FIG. 1, for example, selecting a certain processor with a particular speed may limit the available options for memory which are compatible with the selected processor. Therefore, the customers options for selecting a memory option are limited by the previous selection of a processor. Accordingly, when the user initiates the pull down selection for the memory option, available options may be limited based upon a processor speed of a previously selected processor.

In alternative embodiments, commands may be directed to affecting selections previously made by the customer. For example, referring back to FIG. 1, the customer may make an initial selection of a processor with a particular processor speed and followed by a subsequent selection of a memory device. Rather than limiting the available memory devices based upon a previous selection of a processor, the command may be directed to overriding a previous selection of a processor based upon a subsequent selection of a memory option. For example, if a subsequently selected memory option is not compatible with the previously selected processor, the command is directed to overriding the previous processor selection with the most similar processor selection which is compatible with the subsequently selected memory option. Alternatively, the command may be directed to providing the customer with a prompt in response to the subsequent selection of a memory option, indicating an incompatibility with a previous selection of a processor. Here, the prompt would give the customer the option to reselect a processor which is compatible with the subsequent selection of the memory option.

Figure 3:
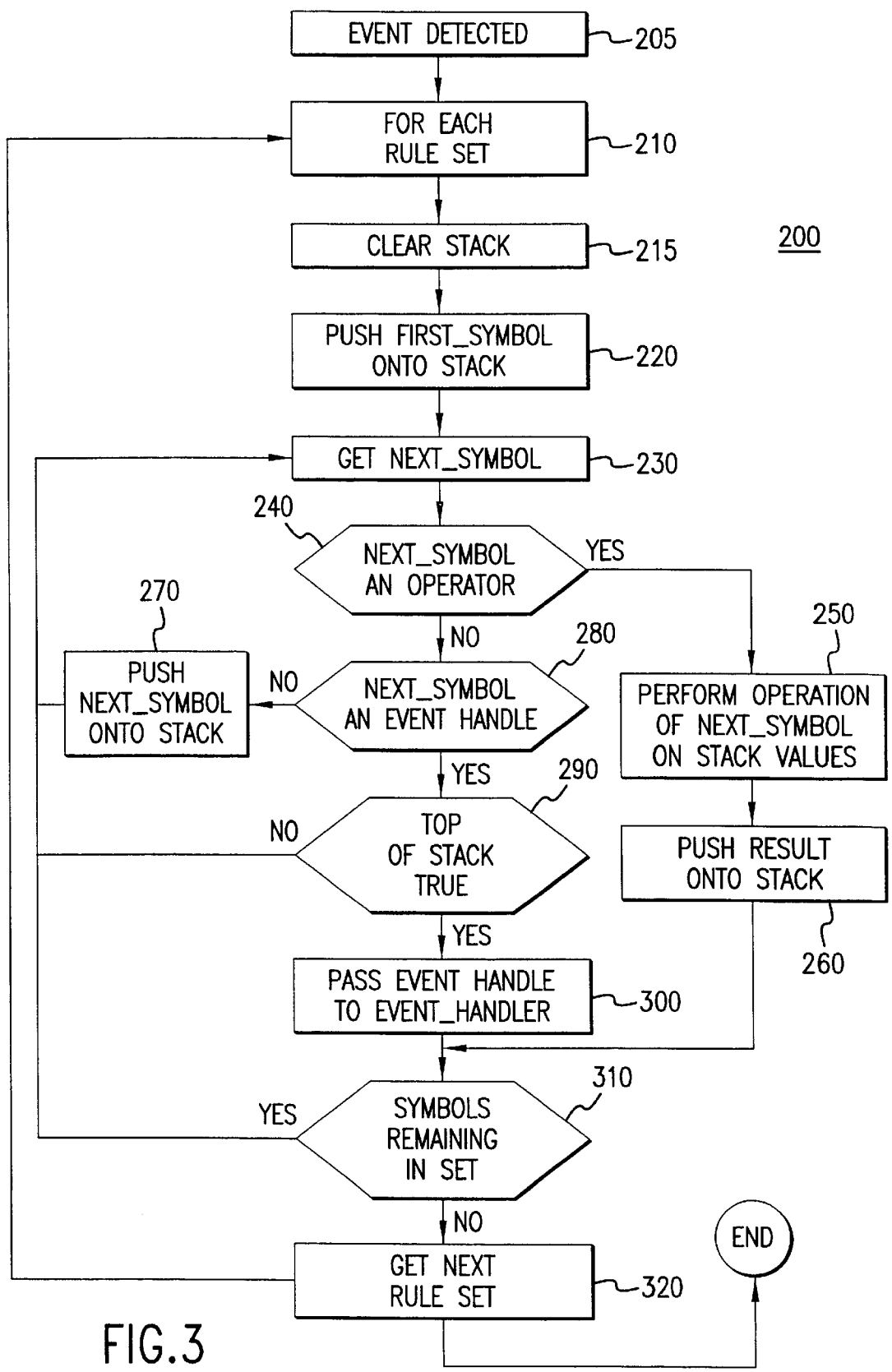
FIG. 3 shows a functional flow diagram illustrating the processing of the constraints engine shown in FIG. 2 according to an embodiment.

FIG. 3 shows a functional flow diagram illustrating processing logic of the constraints engine 102 according to an embodiment. At step 105, the Worldwide Web page 104 detects an event which requires execution of the constraints engine 102 to determine whether a system constraint is violated. In one embodiment, such an event occurs whenever a customer makes a selection from the Worldwide Web page 104. In another embodiment, such an event occurs when the webserver transmits a change to the rules 108. In yet another embodiment, such an event occurs whenever the customer makes a selection or the webserver transmits changes to the rules 108.

Referring back to FIG. 2, upon detecting such an event at step 205, the Worldwide Web page 104 initializes the constraints engine 102 with the current rules 106 in the form of strings of symbols as illustrated in Table 3. Step 210 detects a beginning of a constraint by processing a symbol beginning with a "$." The constraints engine 102 clears the stack at step 215 and pushes the data represented by the first symbol in the string (which is invariably an operand) onto the stack at step 220. The constraints engine 102 then sequentially determines whether each of the symbols is an operator at step 240, an event handle at step 280, or an operand.

If the symbol is an operator, the constraints engine 102 performs the operation of that symbol on values popped from the stack and pushes the result of the operation onto the stack at step 250. If the symbol is an operand, the constraints engine 102 retrieves the data associated with the operand and pushes that data onto the stack at step 270. If the symbol is an event handle, the constraints engine 102 determines whether the value at the top of the stack is a "true" Boolean value, and if so, passes the event handle to the event handler at the Worldwide Web page 104. When all of the symbols in the current string have been processed, the constraints engine 102 at step 320 returns to step 210 to process the symbols in the next rule set.

FIG. 3 illustrates an embodiment in which the constraint engine 102 sequentially processes each of the strings of symbols, one symbol at a time. It should be understood, however, that the Worldwide Web page 104 may control the constraint engine 102 to process the individual strings in parallel by, for example, maintaining more than one instance of the constraint engine 102 at any one time. The distinct instances of the constraint engine 102 can process different strings of symbols which represent corresponding different system constraints.

The above-described system for providing instruction sets to a fixed logic at the general constraint engine provides for simple implementation of constraint rules in a system such as that illustrated above with reference to FIG. 1. Modification of the constraint logic, therefore, only involves the addition of, or deletion of, specific instruction sets which are representative of specific constraints. The underlying logic of the constraints engine 102 is independent of the actual constraints and is therefore fixed for each set of constraints.

While the application illustrated above is directed to the problem of assessing dynamic selections (from the customer) against fixed constraints, the constraints engine 102 may also be applied to systems which evaluate fixed selections against rules which change. In this embodiment, the constraint engine 102 is preferably executed each time a new instruction set is added, for example. In other applications, the constraints engine 102 may be applied to systems which evaluate dynamic selections against dynamic rules. In this embodiment, the constraint engine 102 is executed whenever a new instruction set is added or a new selection is made, for example.

Also, the application of embodiments of the present invention is not limited to built to order systems and may be applied to monitor many types of systems for which constraints may be defined. For example, an embodiment may be directed to automatic test equipment which monitors a system for detecting system faults. Here a diagnostic scheme defines constraints as a function of system critical variables. The strings of symbols representing the constraints may be processed on a periodic basis for the detection of system faults.

In another example, the constraint engine may be applied to a custom service system in which customers select items of service to be performed in a total customer service package. As in the custom built to order system, the total service package for a particular customer may be subject certain constraints as defined as a function of individual customer selections. Accordingly, the constraint engine processes strings of symbols representing these constraints defined as a function of the customer selections to detect when a customer selection violates a constraint.

In yet another example, the constraint engine may be applied to a system which simply monitors a system to determine whether certain conditions are met as a function of certain variables. In this embodiment, each of the strings of symbols represents more generally a system "condition" (as compared with a system "constraint"). The constraint engine therefore processes the symbols in the strings determine whether one or more system conditions are "met" (as compared with determining whether a constraint is "violated").

Additionally, application of embodiments of the constraint engine are not limited to processes controlled by a Worldwide Web page initiated by an Internet connection. For example, embodiments of the constraint engine may be implemented in embedded processing environments or control systems which respond to system variables defining constraints or conditions. Again, in any of the above discussed embodiments, the constraint engine may be controlled to processes strings of symbols upon changes in the constraint/condition rules, changes in system variables which define the constraint/condition rules or at user specified periods or events.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. In an automated built to order system capable of receiving product specifications from customers interactively, a method for automatically responding to a violation of a product specification constraint comprising:

representing a product specification constraint as a string of symbols, each symbol representing one of an operator for providing a Boolean result, an operand and a command; and serially processing each symbol in the string one symbol at a time as follows:

if the symbol is representative of an operand, pushing the data representative of the symbol onto a stack maintained in a computer readable memory, the stack having a top which includes a last data item pushed onto the stack;

if the symbol is representative of an operator, executing the operator based upon at least one operand retrieved from the top of the stack and pushing the result of the execution of the operator onto the stack; and if the symbol is representative of a command, result conditionally executing the command based upon the Boolean result.

2. The method of claim 1, wherein at least one command is for transmitting a message indicative of a violation of the constraint.

3. The method of claim 1, the step of representing a constraint as a string of symbols further includes:

receiving data representative of customer design choices; and including an operand based upon at least one of the customer design choices in at least one of the strings of symbols.

4. The method of claim 1, wherein the method further includes receiving data associated with the product specification constraints through a connection including the Internet.

5. The method of claim 1, the method further including performing the step of serially processing each symbol in the string upon detection of a customer selection.

6. The method of claim 1, wherein the automated built to order system sequentially receives selections from a customer defining product specifications, the method further comprising:

receiving a first customer selection;

receiving a second customer selection subsequent to the first customer selection; and upon receiving the first customer selection, performing the step of serially processing for at least one string of symbols having a conditional command for limiting available selections for the second customer selection based upon the first customer selection.

7. The method of claim 1, wherein the automated built to order system sequentially receives selections from a customer defining product specifications, the method further comprising:

receiving a first customer selection;

receiving a second customer selection subsequent to the first customer selection; and upon receiving the second customer selection, performing the step of serially processing for at least one string of symbols having a conditional command for one of overriding the first customer selection based upon the second selection and transmitting a prompt to the customer for changes to the first customer selection based upon the second customer selection.

8. The method of claim 1, the method further including:

representing a plurality of product specification constraints as one of a plurality of strings of symbols; and performing the step of serially processing for each of the strings of symbols.

9. The method of claim 8, the method further including performing the step of serially processing for each of the strings of symbols upon detection of changes in the strings of symbols.

10. A computer readable medium for use in conjunction with an automated built to order system capable of receiving product specifications from customers interactively, the computer readable medium including computer readable instructions encoded thereon for performing the following:

representing a constraint as a string of symbols, each symbol representing one of an operator for providing a Boolean result, an operand and a command; and serially processing each symbol in the string one symbol at a time as follows:

if the symbol is representative of an operand, pushing the symbol onto a stack maintained in a computer readable memory, the stack having a top which includes a last symbol pushed onto the stack;

if the symbol is representative of an operator, executing the operator based upon an operand retrieved from the top of the stack and pushing the result of the execution of the operator onto the stack; and if the symbol is representative of a command, retrieving a Boolean result from the top of the stack and conditionally executing the command based upon the retrieved Boolean result.

11. The computer readable medium of claim 10, wherein at least one command is for transmitting a message indicative of a violation of the constraint.

12. The computer readable medium of claim 10, the step of representing a constraint as a string of symbols further includes:

receiving data representative of customer design choices; and including an operand based upon at least one of the customer design choices in at least one of the strings of symbols.

13. The computer readable medium of claim 10, the computer readable medium further including computer readable instructions encoded thereon for receiving data associated with the product specification constraints through a connection including the Internet.

14. The computer readable medium of claim 10, the computer readable medium further including computer readable instructions encoded thereon for performing the step of serially processing each symbol in the string upon detection of a customer selection.

15. The computer readable medium of claim 10, the computer readable medium further including computer readable instructions encoded thereon for:

representing a plurality of product specification constraints as one of a plurality of strings of symbols; and performing the step of serially processing for each of the strings of symbols.

16. The computer readable medium of claim 15, the computer readable medium further including computer readable instructions encoded thereon for performing the step of serially processing for each of the strings of symbols upon detection of changes in the strings of symbols.

17. A system for processing data representative of design choices in a built to order system, the system comprising:

a first computer readable memory having encoded thereon one or more strings of symbols, each string representing a design constraint, each symbol representing one of an operator for providing Boolean result, an operand and a command; and a processor for serially processing each symbol in the string one symbol at a time as follows:

if the symbol is representative of an operand, pushing the symbol onto a stack maintained in a second computer readable memory, the stack having a top which includes a last symbol pushed onto the stack;

if the symbol is representative of an operator, executing the operator based upon an operand retrieved from the top of the stack and pushing the result of the execution of the operator onto the stack; and if the symbol is representative of a command, retrieving a Boolean result from the top of the stack and conditionally executing the command based upon the retrieved Boolean result.

18. The system of claim 17, wherein at least one command is for transmitting a message indicative of a violation of the constraint.

19. The system of claim 17, wherein at least one string of symbols includes an operand based upon data representative of at least one customer design choice.

20. The system of claim 17, wherein the product specification constraints are based upon data received through a connection including the Internet.

21. The system of claim 17, wherein the processor performs the step of serially processing each symbol in the string upon detection of a customer selection.

22. The system of claim 17, wherein the first computer readable memory has encoded thereon a representation of a plurality of product specification constraints as a plurality of strings of symbols, and wherein the processor performs the step of serially processing for each of the strings of symbols.

23. The system of claim 22, wherein the processor performs the step of serially processing for each of the strings of symbols upon detection of changes in the strings of symbols.

24. A method for automatically responding to one of a violation of a constraint and satisfaction of a condition of a system defining one or more constraints or conditions, the method comprising:

representing one of a constraint and a condition as a string of symbols, each symbol representing one of an operator for providing a Boolean result, an operand and a command; and serially processing each symbol in the string one symbol at a time as follows:

if the symbol is representative of an operand, pushing the symbol onto a stack maintained in a computer readable memory, the stack having a top which includes a last symbol pushed onto the stack;

if the symbol is representative of an operator, executing the operator based upon an operand retrieved from the top of the stack and pushing the result of the execution of the operator onto the stack; and if the symbol is representative of a command, retrieving a Boolean result from the top of the stack and conditionally executing the command based upon the retrieved Boolean result.

\* \* \* \* \*